United States Patent
Copeland et al.

(10) Patent No.: US 11,112,043 B2
(45) Date of Patent: *Sep. 7, 2021

(54) RESTRAINED GASKET FOR PLASTIC PIPES

(71) Applicant: McWane, Inc., Birmingham, AL (US)

(72) Inventors: Daniel A. Copeland, Bessemer, AL (US); Michael C. Keel, Birmingham, AL (US)

(73) Assignee: McWane, Inc., Birmingham, AL (US)

( * ) Notice: Subject to any disclaimer, the term of this patent is extended or adjusted under 35 U.S.C. 154(b) by 13 days.

This patent is subject to a terminal disclaimer.

(21) Appl. No.: 16/789,921

(22) Filed: Feb. 13, 2020

(65) Prior Publication Data

US 2020/0200311 A1    Jun. 25, 2020

Related U.S. Application Data

(63) Continuation of application No. 16/263,857, filed on Jan. 31, 2019, now Pat. No. 10,619,779, which is a continuation-in-part of application No. 15/683,057, filed on Aug. 22, 2017, now Pat. No. 10,663,095, which is a continuation-in-part of application No. 15/151,932, filed on May 11, 2016, now Pat. No. 10,288,199, and a continuation-in-part of application No. 15/263,543, filed on Sep. 13, 2016, now Pat. No. 10,436,359, and a continuation-in-part of application No. 29/607,895, filed on Jun. 16, 2017, now Pat. No. Des. 834,690, and a continuation-in-part of (Continued)

(51) Int. Cl.
| | |
|---|---|
| *F16L 37/08* | (2006.01) |
| *F16L 37/084* | (2006.01) |
| *F16L 21/035* | (2006.01) |
| *F16L 47/08* | (2006.01) |
| *F16J 15/12* | (2006.01) |
| *F16L 21/08* | (2006.01) |
| *F16L 21/00* | (2006.01) |

(52) U.S. Cl.
CPC ......... *F16L 37/0845* (2013.01); *F16J 15/121* (2013.01); *F16L 21/007* (2013.01); *F16L 21/035* (2013.01); *F16L 21/08* (2013.01); *F16L 47/08* (2013.01)

(58) Field of Classification Search
CPC ........ F16L 37/0845; F16L 47/08; F16L 21/02
See application file for complete search history.

(56) References Cited

U.S. PATENT DOCUMENTS

| | | | |
|---|---|---|---|
| 10,619,779 B2 * | 4/2020 | Copeland | F16L 37/0845 |
| 2013/0043656 A1 * | 2/2013 | Copeland | F16L 37/0845 |
| | | | 277/314 |

* cited by examiner

*Primary Examiner* — David Bochna
(74) *Attorney, Agent, or Firm* — C. Brandon Browning; Maynard, Cooper & Gale, PC

(57) ABSTRACT

A gasket for preventing the separation of a pipe joint formed between plastic pipes such as pipes manufactured from PVC. The invention provides an internally restrained pipe joint including a bell with a substantially V-shaped annular groove. The annular groove includes a front radial wall and a rear radial wall and a gasket seated in the annular groove. The gasket includes an inner radial face, an opening defined by the inner radial face and an outer radial face with a front radial section located adjacent to the front radial wall of the annular groove and a rear radial section located adjacent to the rear radial wall of the annular groove. A plurality of toothed, rigid restraining segments is at least partially embedded in the gasket.

18 Claims, 9 Drawing Sheets

Related U.S. Application Data application No. 29/610,412, filed on Jul. 12, 2017, now Pat. No. Des. 857,859, said application No. 16/263,857 is a continuation-in-part of application No. 29/610,414, filed on Jul. 12, 2017, now Pat. No. Des. 846,095.

RESTRAINED GASKET FOR PLASTIC PIPES

RELATED APPLICATIONS

This application is a continuation of and claims priority to U.S. application Ser. No. 16/263,857, filed on Jan. 31, 2019, and titled "Restrained Gasket for Plastic Pipes," which issued on Apr. 14, 2020, as U.S. Pat. No. 10,619,779, which is a continuation-in-part of U.S. application Ser. No. 15/683,057, filed on Aug. 22, 2017 and titled "Restrained Gasket for Plastic Pipes," U.S. application Ser. No. 15/151,932, filed on May 11, 2016 and titled "Restrained Plastic Pipe Joint and Method of Making Same," which issued on May 14, 2019, as U.S. Pat. No. 10,288,199, U.S. application Ser. No. 15/263,543, filed on Sep. 13, 2016 and titled "Restrained Plastic Pipe Joint and Method of Making Same," which issued on Oct. 8, 2019, as U.S. Pat. No. 10,436,359, U.S. application Ser. No. 29/607,895, filed on Jun. 16, 2017 and titled "Gasket Locking Segment Having Single Spigot Tooth," which issued on Nov. 27, 2018, as U.S. Pat. No. D834,690, U.S. application Ser. No. 29/610,414, filed on Jul. 12, 2017 and titled "Restrained Gasket," which issued on Apr. 16, 2019, as U.S. Pat. No. D846,095, and U.S. application Ser. No. 29/610,412, filed on Jul. 12, 2017 and titled "Inner Surface of Restrained Gasket," which issued on Aug. 27, 2019, as U.S. Pat. No. D857,859, the entire contents of which are incorporated herein by reference.

FIELD OF THE INVENTION

The present invention is directed to a pipe gasket and, more particularly, to a restrained pipe gasket for restraining a spigot of a first plastic pipe within a bell of a second plastic pipe, the pipe gasket including rigid locking segments configured for decreasing the force required to insert the spigot into the bell while preventing separation therebetween.

BACKGROUND OF THE INVENTION

Pipe joint gaskets including anti-slip segments for preventing the separation of interconnected, telescoping metal pipes in applications where a fluid such as water for fire mains is held under high pressure are known in the art. Exemplary gaskets are described in U.S. Pat. Nos. 5,295,697 and 5,464,228 in which a rubber gasket, serving as a fluid seal, includes toothed metal segments spaced around its inner perimeter. The toothed metal segments bite into the outer surface of the spigot of the inserted pipe and prevent withdrawal of the inserted pipe from a bell end of the other pipe, which can be caused by unbalanced hydrostatic or hydrodynamic forces. Hydrostatic and hydrodynamic forces that are unbalanced within a pipeline are referred to as thrust forces. Thrusts occur whenever there is a change in the direction of flow within a pipeline or the cross-sectional area of the pipeline. A shortcoming of restrained gaskets is that during fluid pressurization of the interconnected pipes, excessive axial thrust force generated by the resulting hydrostatic pressure can cause the acutely pointed, metal segments to exert destructive radial loads upon the inner axial surface of the bell end and the outer axial surface of the spigot end. In many instances, these radial loads are great enough to fracture the spigot and bell ends of the metal pipes.

Since toothed, anti-slip segments are known to destructively impinge upon metal pipes, the use of gaskets containing such or similar segments for preventing the separation of interconnected plastic pipes has been limited, especially in high pressure applications. Instead, plastic pipes, such as those formed from thermoplastic materials including polyethylene, polybutylene, polypropylene and poly(vinyl chloride) or PVC, are typically joined together by means of a bell-and-spigot gasket-sealed joint utilizing self-restrained gaskets often referred to as Rieber gaskets. A Rieber gasket consists of a continuous steel band either externally or internally bonded to an elastomer annular body. The Rieber gasket is locked into place within an annular groove of the bell, and the toothless steel band functions to prevent the gasket from becoming dislodged therefrom. The Rieber gasket fails however to sufficiently restrain axial separation of plastic pipes along a joint upon fluid pressurization of, or the occurrence of thrust forces within, the pipe joint at high pressure. Consequently, to restrain plastic pipes, external harness and other mechanical joint type glands must be used.

U.S. Pat. No. 9,400,073 describes a restrained pipe seal for sealing a joint between plastic pipes. The seal includes a plastic carrier member and a sealing member attached to the carrier member. The plastic carrier member includes retaining inserts for gripping a spigot of one pipe and a bell of another pipe for holding the pipes together against thrust forces, the inserts including multiple spigot teeth. Shortcomings of the pipe seal include both difficulty and expense related to manufacturing the seal. These shortcomings arise from requirements that the plastic carrier be made separately from the sealing member and then loaded into a rubber mold along with the retaining inserts. Further, the plastic carrier must also be of a sufficiently tough material to resist the heat of the gasket manufacturing process (vulcanizing process) which further increases the cost. Additionally, if the material of the plastic carrier is too inelastic, insertion of the pipe seal into a pipe bell may be prohibited.

SUMMARY OF THE INVENTION

The present invention is directed to a gasket for preventing the separation of a pipe joint formed between plastic pipes such as pipes manufactured from PVC. The invention is based upon the discovery that gaskets containing toothed, metal locking segments can form seals between joined plastic pipes and prevent separation of the pipes caused by thrust forces without the metal segments destructively impinging upon the pipes. The invention is further based upon the discovery that such gaskets allow for hand assembly of restrained plastic pipe joints and the retrofitting of Rieber gasket-containing plastic bells with internally restrained gaskets. The invention is additionally based upon the discovery that the number and spacing of the locking segments on a gasket can be optimally selected so as to decrease an amount of stress on the plastic pipes joined by the gasket, where excessive stress may damage the restrained pipes, while still providing sufficient axial restraint to prevent the separation of the pipes caused by thrust forces.

According to one aspect of the invention there is provided a pipe gasket for restraining a spigot of a first plastic pipe within a bell of a second plastic pipe, the pipe gasket including a compressible annular body and a plurality of rigid segments partially embedded within the compressible annular body. At least one of the rigid segments has an axially extending, radially inward facing, exposed surface, i.e., a surface not covered by material of the compressible annular body, defining a unitary, acutely pointed spigot tooth and including opposing lateral edges, a proximal edge, a distal edge and a flat portion that extends to and between the distal edge and the unitary spigot tooth and to and between the opposing lateral edges. The unitary spigot tooth extends along the proximal edge and projects radially inward from an inner annular surface of the compressible annular body. The unitary spigot tooth provides the only spigot penetrating portion of the rigid segment. At least one bell tooth extends axially from an outer, embedded surface of the segment, the bell tooth being configured to engage and impinge upon the bell end of the second pipe.

In use, the pipe gasket is seated into the bell, and the spigot is inserted into the bell and through an opening defined by the inward facing annular surface of the compressible annular body whereby the spigot directly contacts and slides across the flat portion of the inward facing exposed surface of the rigid segment from about the distal edge of the exposed surface to the unitary spigot tooth. The exposed flat portion serves to substantially decrease the insertion force required to push the spigot into the bell and through the pipe gasket compared to present plastic pipe gaskets, such as Rieber gaskets, which include an inward facing annular surface composed entirely of a rubber. This is because rubber has a kinetic frictional coefficient with respect to plastics, in general, that is greater than that of steel or other metals. The locking segment and gasket design of the present invention therefore allows for hand assembly of restrained plastic pipe joints without the need for additional machines or equipment. Upon pressurization of the pipes or the realization of thrust forces, the unitary spigot tooth impinges non-destructively upon the spigot and the at least one bell tooth impinges non-destructively upon the bell thereby locking the pipes together.

According to another aspect of the invention, there is provided a pipe gasket for restraining a spigot of a first plastic pipe within a bell of a second plastic pipe, the pipe gasket including a ring fabricated from a compressible material, the ring having an inner annular surface and an outer annular outer surface, a void within the ring, a first opening extending through the inner annular surface and into the void and a restraining segment seated within the void. The restraining segment includes a unitary spigot tooth extending radially inward from a proximal edge of the restraining segment and a flat portion extending distally from the unitary spigot tooth to a distal edge of the restraining segment, the flat portion being essentially flush with the inner annular surface. A second opening is formed within the ring that extends through the outer annular surface and into a second void. At least one bell tooth of the restraining segment is located within or adjacent to the second opening. The second opening is configured to receive compressible material of the ring that is displaced by the engagement of the at least one bell tooth with the bell and pressing of the ring against bell.

According to another aspect of the invention, there is provided a pipe gasket for restraining a spigot of a first plastic pipe within a bell of a second plastic pipe, the pipe gasket including a compressible body having an inner annular surface, an outer annular outer surface and a first opening in the inner annular surface, the first opening having opposing lateral edge portions, a proximal edge portion and a distal edge portion. A restraining segment is partially embedded within the compressible body, the restraining segment having a first face that extends to and between the opposing lateral edge portions and to and between the proximal edge portion and the distal edge portion of the first opening. The first face defines a unitary spigot tooth extending along the proximal edge portion of the first opening and includes a substantially flat portion that is flush with the inner annular surface and extends distally from the single spigot tooth to the distal edge portion of the first opening.

According to another aspect of the invention, there is provided a method of restraining a spigot of a first plastic pipe within a bell of a second plastic pipe. The method includes providing a pipe gasket including rigid locking segments, at least one of the locking segments including an acutely pointed bell tooth, an acutely pointed spigot tooth and a flat surface extending to and between the spigot tooth and a distal edge of the at least on locking segment, and seating the pipe gasket into an annular groove of the bell. The spigot is then inserted by hand, without the aid of a powered machine, into the bell and through an opening defined by the pipe gasket. Upon pressurization of the pipes, the spigot tooth impinges upon the spigot and the bell tooth upon the bell thereby locking the pipes together. In certain instances, the pipe gasket can be used to convert a plastic pipe bell containing a self-restraining gasket, such as a Rieber gasket, wherein the gasket provides insufficient joint restraint, thus requiring the use of external harness restraints, to a plastic pipe bell including a sufficiently internally restrained joint, thus requiring no external harness restraints.

According to yet another aspect of the invention, there is provided a restrained pipe joint including an annular gasket located within an annular groove of a bell socket of a first plastic pipe. The annular gasket includes an inner annular surface defining a first circumference having a first length and a plurality of rigid segments partially embedded and concentrically arranged within the gasket. Each rigid segment of the plurality of rigid segments includes at least one spigot tooth row having opposing lateral edges and a second length extending to and between the opposing lateral edges. A second plastic pipe is inserted through an opening defined by the inner annular surface and impinged upon by the plurality of rigid segments, the second plastic pipe having an outer second circumference and an inner diameter. The sum of all of the second lengths is about 40% to about 70%, about 45% to about 65%, about 40% to about 60% and about 40% to about 55%, of the first length or the second circumference.

In another embodiment, the plurality of rigid segments are arranged in groups of two, three, four or more rigid segments, each group of rigid segments being separated from each adjacent group of rigid segments by a first distance that is longer than the second length. Each rigid segment of each group is separated from an adjacent segment or segments of the group by a second distance that is shorter than the second length.

In another embodiment, the second plastic pipe includes an exterior face including a first group of spaced-apart indentations formed therein by a first group of the plurality of rigid segments, the first group of spaced-apart indentations forming a first group of corresponding protrusions on an interior face of the second plastic pipe, wherein first group of corresponding protrusions form a first contiguous protrusion. The second plastic pipe further includes a second group of spaced-apart indentations formed in the exterior face thereof by the second group of the plurality of rigid segments, the second group of spaced-apart indentations forming a second group of corresponding protrusions on the interior face of the second plastic pipe, wherein the second group of corresponding protrusions form a second contiguous protrusion. The first group of the plurality of rigid segments is adjacent to the second group of the plurality of rigid segments, and the first contiguous protrusion is spaced apart from the second contiguous protrusion.

In another embodiment, there is provided an annular gasket in which a plurality of rigid segments is partially embedded within the inner annular surface and is arranged into groups of three rigid segments. The groups of three rigid segments include at least a first group of three rigid segments and a second group of three rigid segments. Each of the first group of three rigid segments and the second group of three rigid segments respectively comprises a central rigid segment and two rigid segments adjacent to the central rigid segments on opposite sides thereof, the central rigid segment being separated from the adjacent rigid segments by a distance of a second length. The inner annual surface includes an intermediary portion located between the first group of three rigid segments and the second group of three rigid segments, the intermediary portion spanning a distance of a third length, and the third length is longer than the second length.

DETAILED DESCRIPTION OF THE INVENTION

Figure 1:
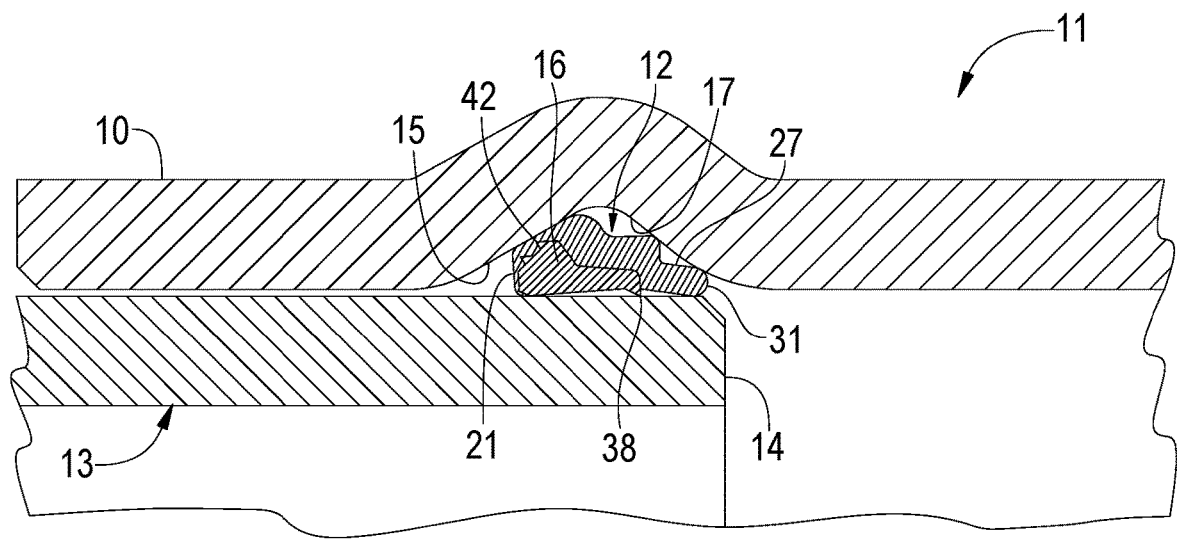
FIG. 1 is a fragmented sectional view of a bell of a first plastic pipe containing a restrained pipe gasket in accordance with a first embodiment of the present invention showing initial insertion of a spigot of a second plastic pipe into the bell and through the pipe gasket.

The present invention is directed to a pipe gasket that is adapted and arranged for forming a sealed and restrained joint between plastic pipes. Generally, the pipe joint includes a bell end 10 of a first plastic pipe 11, a gasket 12 seated within an inner annular groove or retainer groove of bell end 10 and a spigot end 14 of a second plastic pipe 13 inserted through gasket 12, gasket 12 forming a seal between pipes 11 and 13. Toothed locking segments 16 are embedded within and circumferentially arranged around gasket 12. Locking segments 16 are arranged to impinge upon pipes 11 and 13 upon pressurization of, or the occurrence of thrust forces within, the pipe joint thereby restraining axial movement of spigot end 14 out of bell end 10. The foregoing is accomplished without the use of a joint gasket gland, a Rieber gasket or an external harness.

More particularly, as illustrated in FIG. 1, the inner surface of bell end 10 includes an annular retainer groove defined by a front radial wall 15 and a rear radial wall 17 of the inner surface which intersect to provide the retainer groove with a substantially V-shaped or U-shaped cross-section. The annular groove of bell end 10 can be formed by any means known in the art for forming bell ends in plastic pipes including extruding first plastic pipe 13 over a mandrel having a Rieber gasket disposed thereon and removing the first plastic pipe from the mandrel with the Rieber gasket located in the annular groove, for example, as described in U.S. application Ser. No. 14/817,923, the entire contents of which are incorporated herein by reference. Thereafter, the Rieber gasket is removed by hand, for example, with the aid of pry bar to provide an empty annular retainer groove.

Gasket 12 is positioned within the retainer groove with a front outer face 20 thereof being arranged adjacent to and, in sealing engagement with, front radial wall 15 and a rear outer face 22 thereof being arranged adjacent to and, in sealing engagement with, rear radial wall 17. Thus, it is contemplated that the gasket of the present invention can be used to retrofit existing plastic pipe bells which contain Rieber gaskets or other similar, self-restrained gaskets thereby converting the joints formed by the plastic pipe bells from internally unrestrained joints to internally restrained joints.

Gasket 12 is composed of an annular rubber body including a front portion having a substantially V-shaped outer surface defined by an annular front outer face 20 and an annular rear outer face 22 and a smooth inner surface defined by an annular inner face 24. Inner annular surface 24 delineates a circumferential face C1 having a circumferential length L1. Front outer face 20 and inner face 24 are joined by an annular leading face 21 which forms a frontmost edge of gasket 12.

The annular rubber body further includes a middle portion having an L-shaped outer surface defined by an annular horizontal outer face 23 extending rearward from rear outer face 22 and an annular vertical outer face 25 extending radially inward from horizontal face 23. The middle portion further includes a smooth, annular inner surface defined by inner face 24.

Additionally, the annular rubber body includes an annular lip portion 27 which extends slightly radially inward from vertical outer face 25 of the middle portion. Lip portion 27 forms an annular inner surface 29 that is contiguous with inner face 24 and defines a variable circumference or diameter which progressively decreases moving from inner face 24 to a free end 31 of lip portion 27. The variable diameter serves to improve sealing between the gasket and the spigot end of the second pipe since, at its smallest diameter, the diameter of annular inner surface 29 of lip portion 27 is substantially less than the diameter of annular inner face 24 of the gasket. Consequently, inner surface 29 of lip portion 27 forms a tighter seal about the spigot end than does inner face 24 portion of the gasket.

Figure 3:
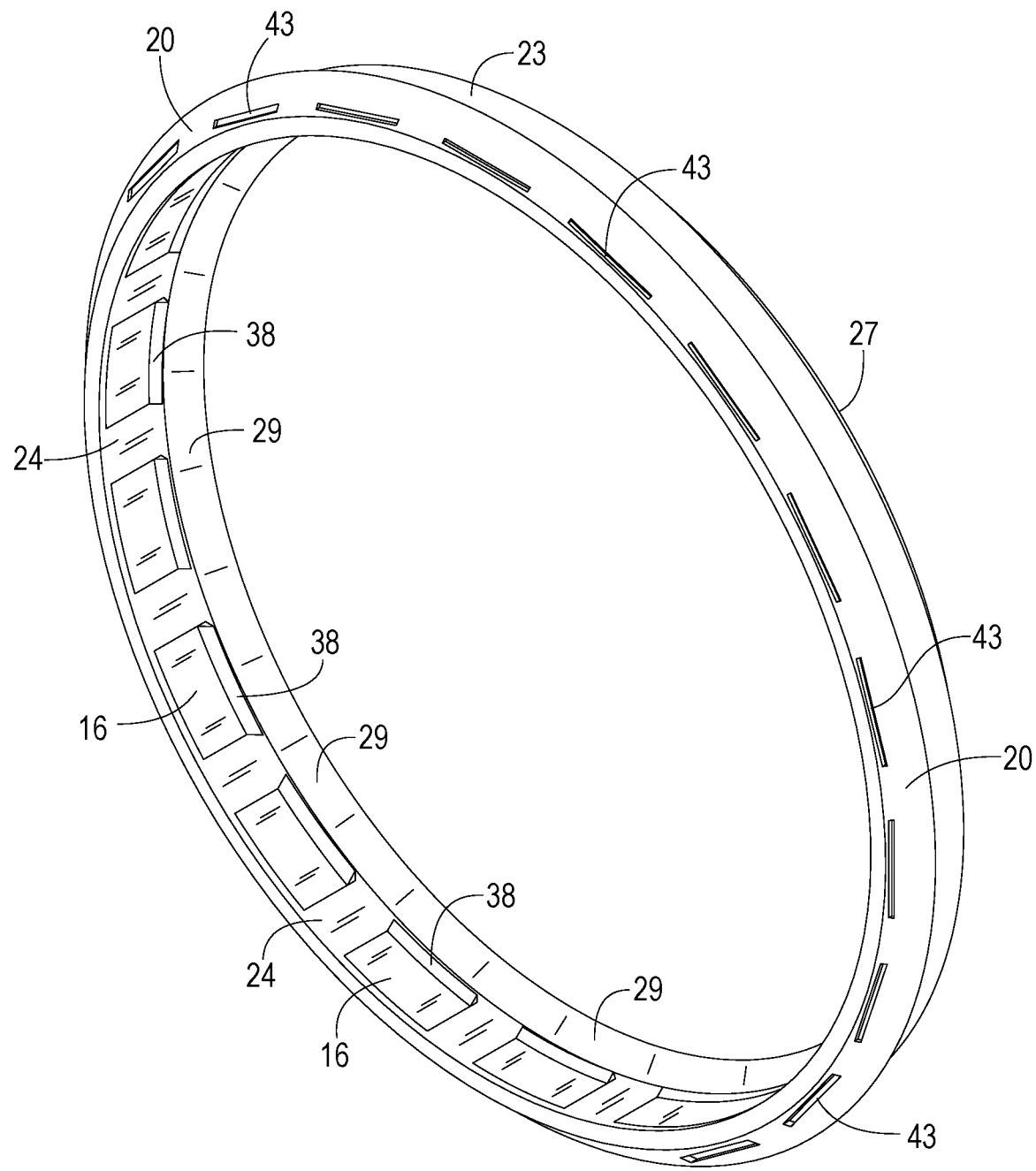
FIG. 3 is a perspective view of the pipe gasket of FIG. 1 showing the placement of locking segments around its periphery.
Figure 4:
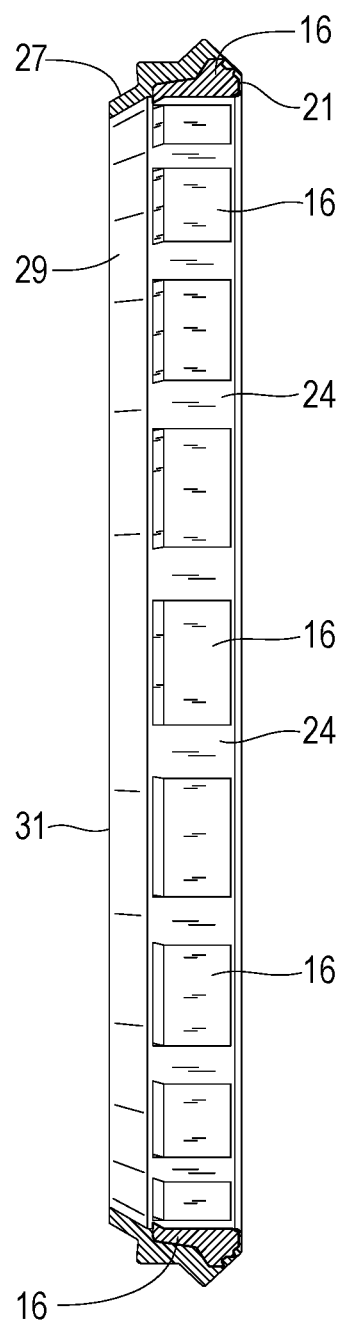
FIG. 4 is a sectional view of the pipe gasket of FIG. 1.
Figure 5:
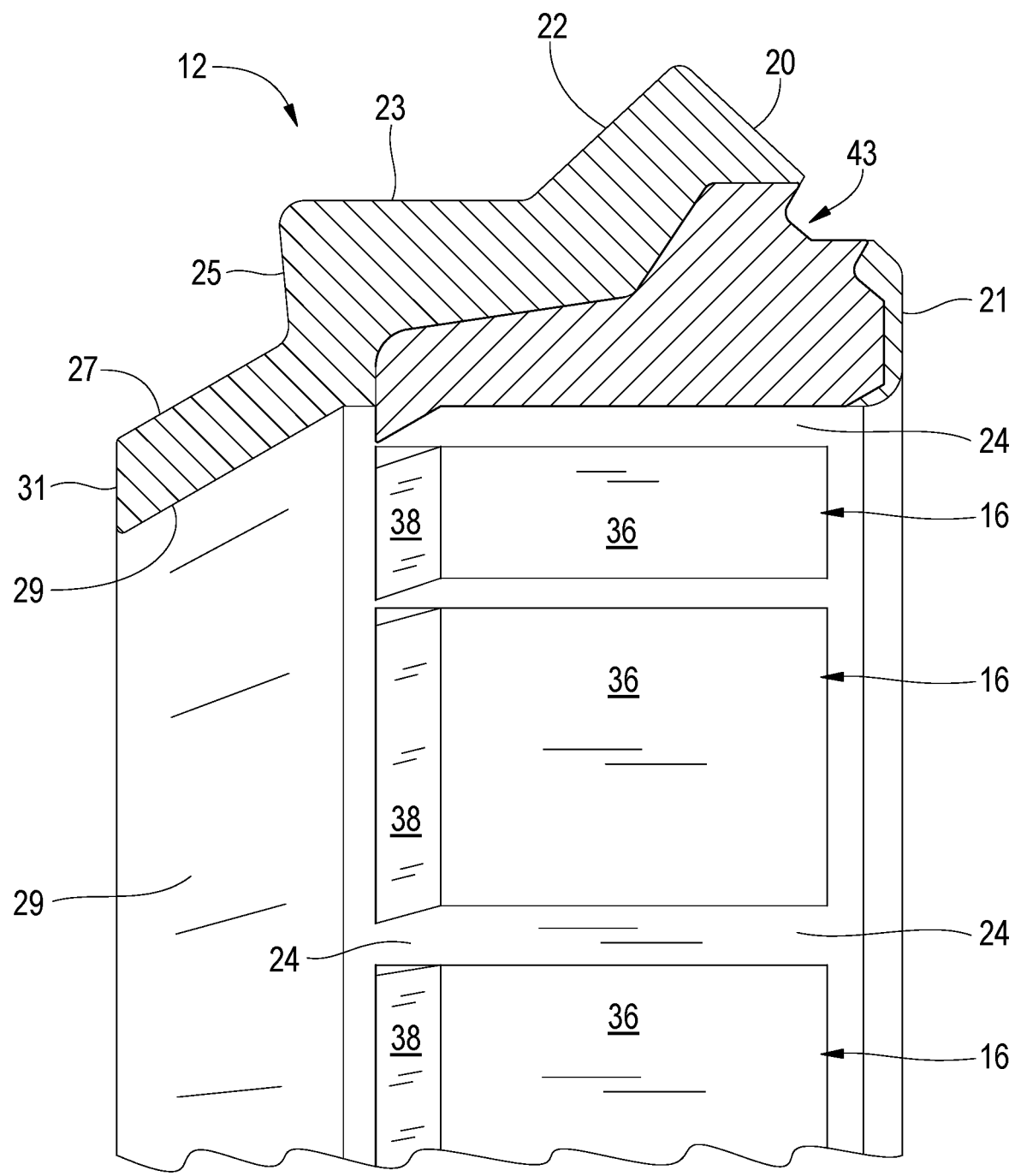
FIG. 5 is a fragmented sectional view of the pipe gasket of FIG. 1.
Figure 6:
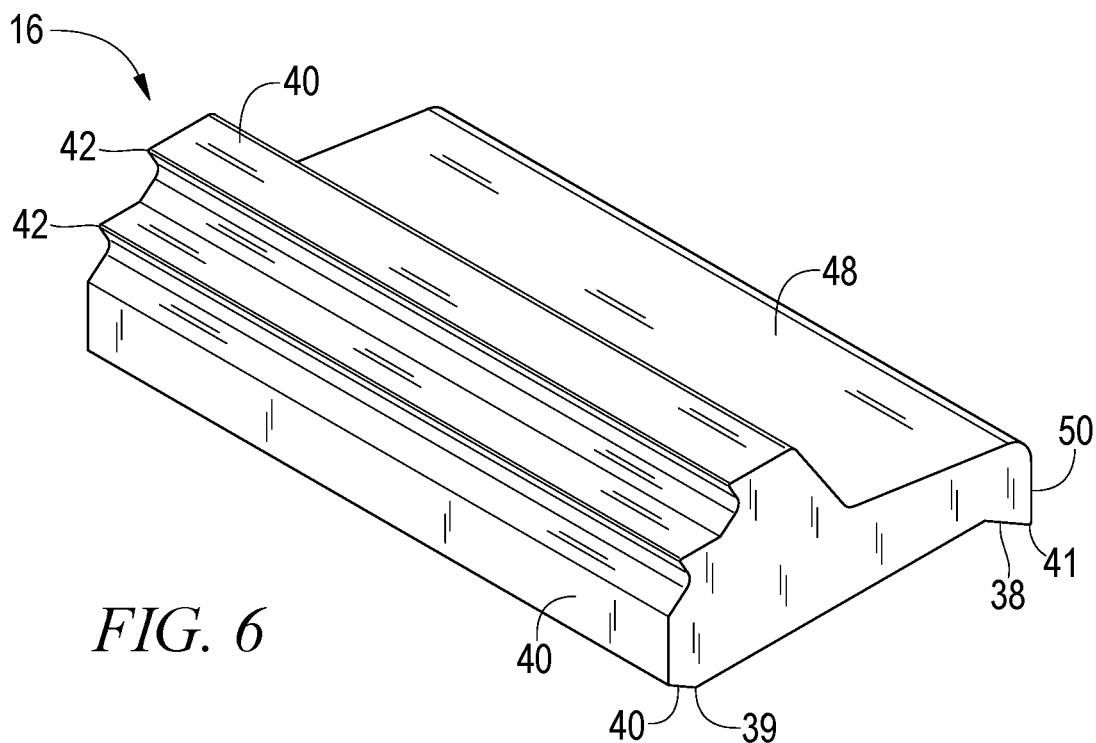
FIG. 6 is a front perspective view of one of the locking segments of FIG. 1.
Figure 7:
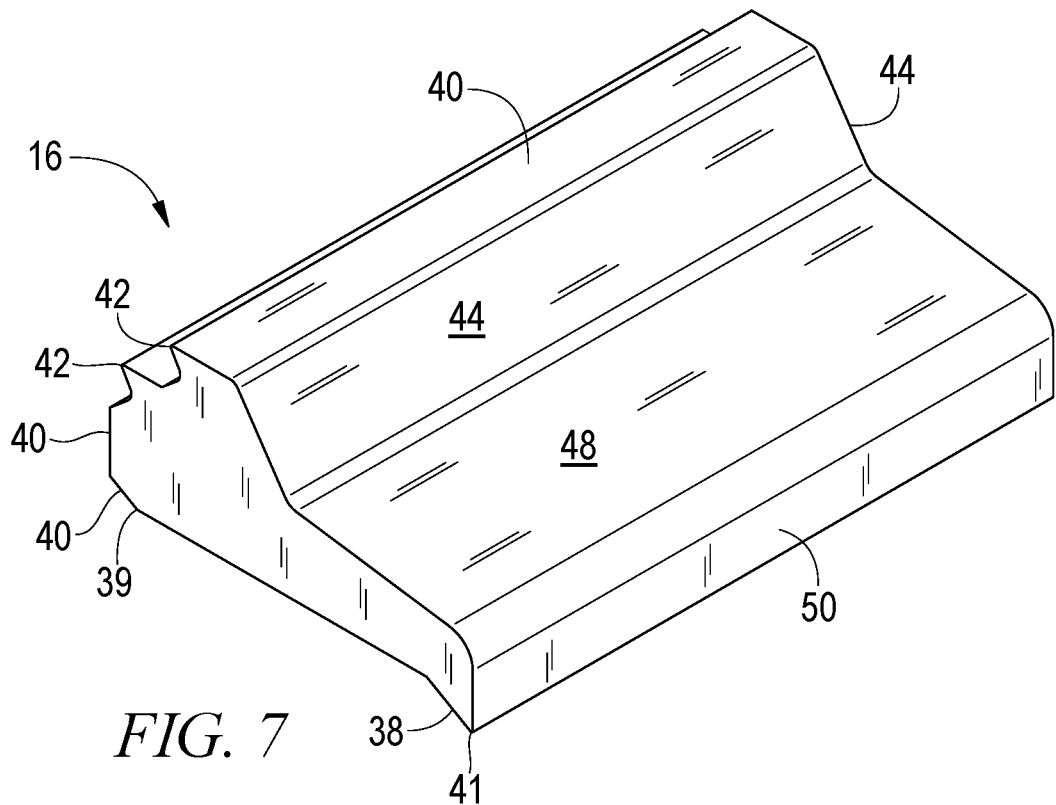
FIG. 7 is a rear perceptive view of the locking segment of FIG. 6.
Figure 8:
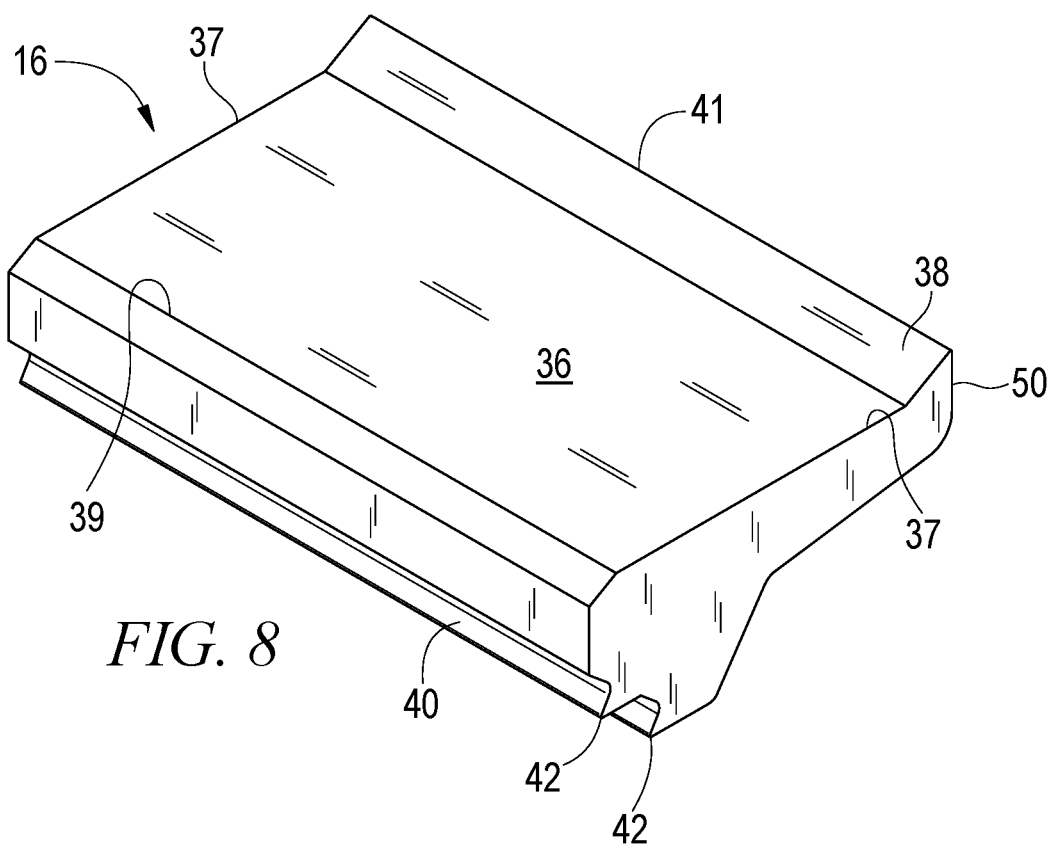
FIG. 8 is a perspective view of a bottom of the locking segment of FIG. 6.
Figure 9:
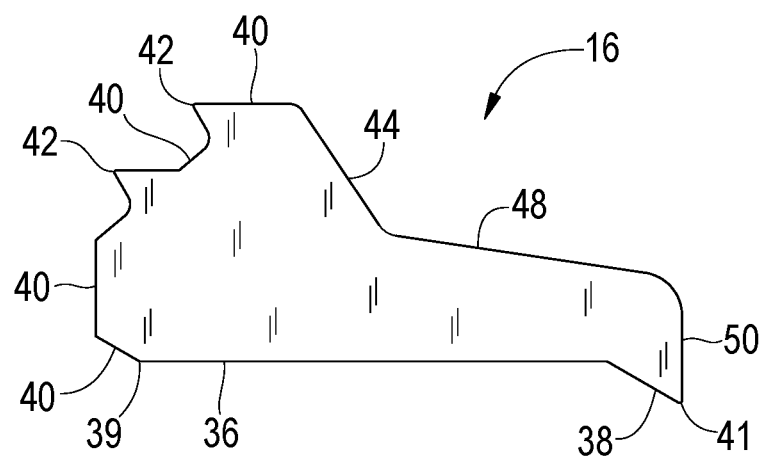
FIG. 9 is an elevation view of a lateral side of the locking segment of FIG. 6.

FIG. 3 depicts a gasket 12, into which are inserted rigid locking segments 16. Locking segments 16 are firmly vulcanized into grooves or voids found within inner face 24 of gasket 12. Each groove or void is accessible through a rectangular opening formed through inner face 24 of gasket 12, each opening having opposing lateral sides, a proximal side and a distal side.

Referring to FIGS. 4 through 9, each segment 16 includes a rectangular shaped, inner surface 36 having a unitary, acutely pointed, spigot tooth 38 extending radially inward therefrom. Inner surface 36, which is not embedded within the rubber body of gasket 12 but rather is exposed, includes opposing lateral edges 37, a distal edge 39, a proximal edge 41, and a length L2 extending to and between lateral edges 37. Inner surface 36 includes a smooth, flat portion that is arranged flush or substantially flush with inner face 24 of gasket 12 with opposing lateral edges 37, distal edge 39, and proximal edge 41 being arranged adjacent to opposing lateral sides, distal side, and proximal side, respectively, of the rectangular shaped opening through inner face 24. The smooth, flat portion extends to and between the opposing lateral edges 37 and to and between the spigot tooth and the distal edge 39. To maximize the flat surface area of the smooth, flat portion of inner surface 36, spigot tooth 38 is arranged to protrude radially inward from along or adjacent to proximal edge 41 of inner surface 36. It is contemplated that unitary tooth 38 may be slightly spaced apart from proximal edge 41 a short distance.

Each segment 16 further includes a front surface 40 that intersects flat inner surface 36 to form a forward-facing, multi-faced nose portion that extends from distal edge 39 to a top portion of the segment. Front surface 40 extends adjacent to and along front outer face 20 of gasket 12. Arranged radially outward of the nose portion along front outer face 40 are two rows of acutely pointed bell teeth 42 extending distally from front outer surface 40. Bell teeth 42 are configured for impinging upon radial wall 15. A rectangular-shaped space 43 is defined between the two rows of bell teeth 42 and is devoid of the rubber body of gasket 12. Space 43 provides a void, open to the surface of the gasket, into which the material of the annular rubber body can flow upon compression of the rubber against the bell and penetration of bell teeth 42 through the rubber.

In addition to inner surface 36 and front outer surface 40, each segment 16 includes a substantially L-shaped rear outer surface defined by a vertical surface 44, which extends proximally and radially inward from outer surface 40, and a horizontal surface 48, which extends proximally from vertical surface 44. Horizontal surface 48 intersects the distal-most surface 50 of segment 16 which forms a portion of spigot tooth 38. L-shaped surface is configured to maximize the mass and thickness of the proximal-most half of the annular rubber body of gasket 12 for improving the sealing performance of gasket 12.

Locking segments 16 are preferably fabricated from a metal such as steel and, more preferably, from a powdered metal such as powdered iron, powered low alloy steel, or powdered alloyed steel. Locking segments 16 fabricated from powdered metal or metals can be formed by powder compaction, powder forging, hot isostatic pressing, metal injection molding, electric current assisted sintering, or additive manufacturing including 3-D printing, selective laser melting, and electron beam melting. A benefit of fabricating locking segments 16 from powdered metal is that powdered metal has lower manufacturing costs than other metal forming methods such as machining, casting or extruding/drawing. In certain instances, the segments fabricated from powdered metal can be formed in place by introducing powdered metal into the voids formed in inner face 24 of gasket 12 and hardening or compacting the metal while the metal is contained within the voids.

Referring to FIG. 1, the restrained, plastic pipe joint of the present invention is assembled by inserting spigot end 14 through an opening defined by inner surface 24 of gasket 12 by hand. A throat of bell end 10 guides spigot end 14 into bell end 10 until a beveled end of spigot end 14 contacts the smooth, flat inner portions of inner surfaces 36 near distal edges 39 of the segments 16. As spigot end 14 moves into bell end 10, the spigot end slides along the smooth, flat portions of inner surfaces 36 of the segments 16 before contacting the spigot teeth 38. As spigot end 14 continues to slide through gasket 12, spigot end 14 presses teeth 38 radially outward thereby causing segments 16 to move radially outward and to compress the annular rubber body of gasket 14 between spigot end 14 and front radial wall 15 and a rear radial wall 17 of the annular retainer groove of bell end 10. This functions to prevent gasket 12 from dislodging from the retainer groove during further insertion of spigot end 14 into bell end 10, as well as to form a seal between pipes 11 and 13. Since each spigot tooth 38 includes a tapered distal-edge, spigot end 14 slides across teeth 38 without the teeth impinging upon pipe 13, despite the compression of the rubber body of gasket 12. In part, that is because the contour of the outer surfaces of the segments relevant to contour of the inner surface of annular retainer groove provides for an annular space therebetween into which the rubber may flow. As spigot end 14 moves farther proximally into bell end 10, it contacts surface 29 of lip portion 27 and causes the lip portion to pivot radially outward and press against rear radial wall 17, thereby increasing the sealing effectiveness of gasket 12 between the spigot and the bell.

Figure 2:
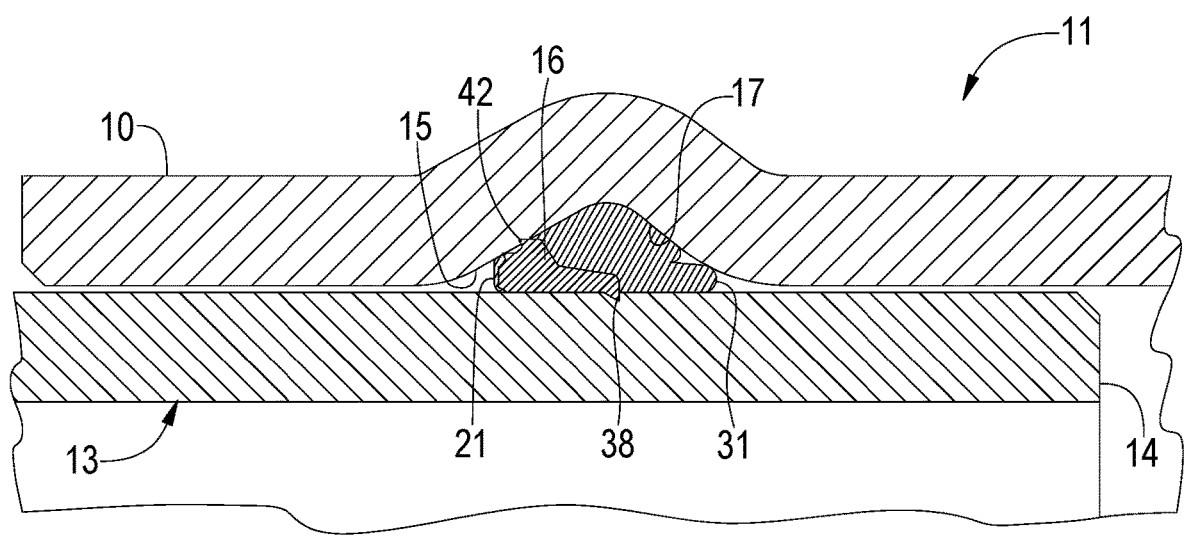
FIG. 2 is a fragmented sectional view of the bell end, the pipe gasket and the spigot of FIG. 1 showing the arrangement of the restraining segment following pressurization of, or the occurrence of thrust forces within, the interconnected pipes.

Referring to FIG. 2, upon pressurization of the pipe joint or the occurrence of thrust forces therein, spigot end 14 moves distally as the axial forces created by fluid pressurization attempt to force pipes 11 and 13 apart. This causes tooth 38 of each segment 16 to engage with spigot end 14 by friction or by penetrating non-destructively a short distance into spigot end 14. Each tooth 38 impinges upon spigot end 14 as pipe 13 moves distally since the proximal edge of each tooth 38 contacts pipe 13 at about a 90° angle. As pressure within the pipe joint is increased to normal operating pressures, segments 16 translate distally within pipe 13 towards front radial wall 15, causing teeth 42 to press through the rubber body and impinge upon front radial wall 15 of the annular retainer groove. The rubber compressed by the pressing of gasket 12 against front radial wall 15 and displaced by penetration of bell teeth 42 through the rubber is caused to flow into space 43. There is no direct segment interaction with space 43. Space 43 provides a void for the displaced rubber, which occurs during joint assembly, caused by gasket compression. Space 43 allows for improved contact between the segment teeth 42 and radial wall 15. The teeth can penetrate this rubber without the aid of gap 43 if the force is high enough, but gap 43 decreases the force required for engagement between the segment and wall 15. Further advancement of segments 16 distally is arrested by the engagement of bell teeth 42 with front radial wall 15 and engagement of each tooth 38 with spigot end 14. In this manner, as segments 16 are urged distally, segments 16 become wedged between bell end 10 and spigot end 14 and the axial forces generated by the pressurization of the pipes are transmitted axially between teeth 38 and rows of teeth 42 and radially to and between the pipes. Further, by impinging teeth 42 into front radial wall 15, radial forces caused by the wedging of segments 16 between pipes 11 and 13 are countered.

The number and/or arrangement of locking segments 16 inserted into gasket 12 vary depending upon the anticipated fluid pressure at the pipe joint, the size of the plastic pipes, i.e., inner diameter, involved, and the desired balance between pipe restraint and spigot integrity. As depicted in the first embodiment shown in FIGS. 3 and 4, segments 16 can be arranged relatively close together and spaced equidistantly apart in a circumferential direction around the circumference of gasket 12, such that a lateral edge of a segment 16 is spaced apart from a lateral edge of the adjacent segment 16 by a length of L2. In the illustrated embodiment, L2 is smaller than the lateral length of a locking segment 16, though the particular value of L2 may vary in different embodiments. The arrangement of segments 16 in gasket 12 is intended to maximize the number of segments in the gasket for maximizing the contact area between segments 16 and a spigot end 14 of pipe 13. Such an arrangement distributes the thrust forces within the joint uniformly about spigot end 14. In this first embodiment, segments 16 intersect or extend across about 70% of circumference C1 of gasket 12 and are therefore configured to impinge into about 70% of a circumference of an exterior face of spigot end 14 of pipe 13.

Figure 10:
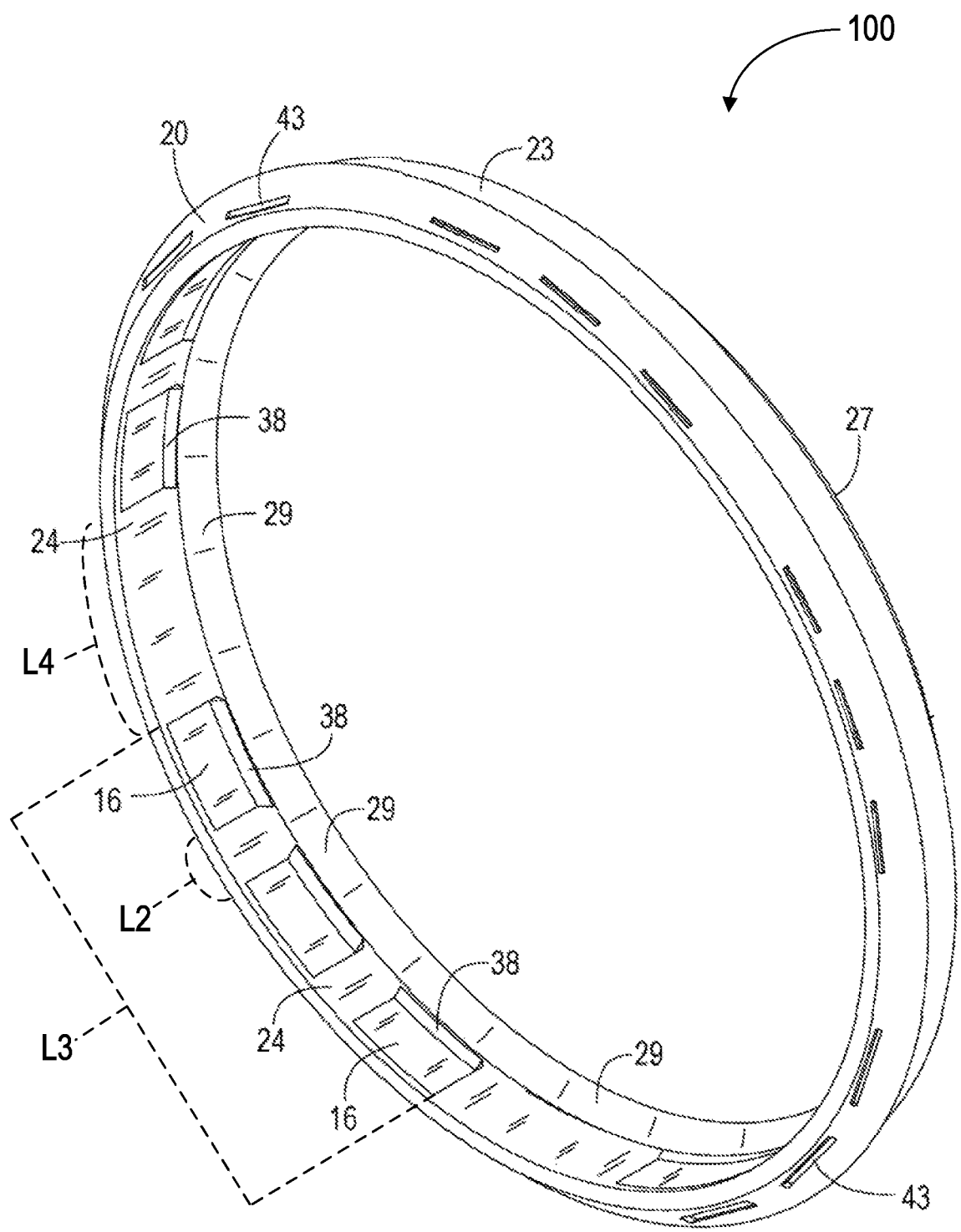
FIG. 10 is a perspective view a pipe gasket in accordance with a second embodiment of the present invention.

In a second embodiment depicted in FIG. 10, a gasket 100 may include locking segments 16 that are arranged in groups (also referred to herein as clusters). The arrangement of segments 16 in gasket 100, which includes fewer segments 16 than are provided in gasket 12 (FIG. 3), results in thrust forces being distributed unevenly about a spigot end 114. In gasket 100 (FIG. 10), segments 16 are arranged in groups of three segments, through grouping may vary in other embodiments, e.g., groupings of 2, 4, 5 or more segments. This embodiment largely mirrors the components of gasket 12 (FIG. 3), however, in gasket 100 (FIG. 10), every fourth locking segment is absent, such that the surface of the annular inner face 24 remains smooth at the portions that would otherwise correspond to the fourth segment. By these means, a lateral edge of a segment 16 on one lateral side of a group of locking segments is spaced apart from a lateral edge of a segment 16 in an adjacent group by a length of L4.

In the illustration of FIG. 10, gasket 100 is configured for use with a standard 6 inch ID PVC pipe which has an outer surface circumference C2 of 21.68 inches. Segments 16 intersect or extend across about 52% of circumference C1 of gasket 100 and are therefore configured to impinge upon about 52% of a circumference C2 of spigot end 114. In alternate embodiments, the segments 16 may be separated from each other by smaller distances than those shown in FIG. 10 (while still being grouped into groups), or more locking segments 16 may be embedded in the gasket, and may therefore impinge upon a higher percentage of the circumference. In the exemplary gasket 100 shown in FIG. 10, segments 16 within a single group of three are separated from their adjacent segment(s) by the same length L2 that separates segments 16 in gasket 12 (FIG. 3). That is, a cluster may be understood to comprise three locking segments 16: a centermost, or "middle" segment, and two segments laterally adjacent to the middle segment, one on each side. The lateral distance between an edge of the middle segment and an edge of one of the adjacent segments is of a length L2. A lateral distance spanning all three segments in a cluster is of a length L3. It will therefore be understood that, in the gasket 100 of FIG. 10, only the distance between the clusters or groups of locking segments (L4) has increased in comparison to the first embodiment of gasket 12.

In the second embodiment, the locking segments 16 on gasket 100 are not arranged equidistantly, but instead are arranged with "gaps" between groups, the distance L4 of such gaps being relatively large compared to the distance L2 between locking segments within a cluster of three. Because of these gaps, the total number of segments 16 extending across the gasket 100 must necessarily impinge on a smaller percentage of the circumference C1 than do the segments 16 of the gasket 12. Therefore, even in alternate implementations of the second embodiment with a varying number and arrangement of locking segments 16, the segments must impinge about 52% of circumference C2 of spigot end 114. Because the second embodiment of FIG. 10 applies less locking segments to impinge upon the spigot end 114 than the first embodiment of FIG. 3, the restrained spigot end 14 of the second embodiment is subjected to areas of uneven stress about circumference C2 when fluid passes through the pipe joint. While the arrangement of segments 16 in the first embodiment of gasket 12 was intended to maximize the number of segments in the gasket and evenly distribute stress along circumference C1 of spigot end 14, the number and arrangement of segments 16 in the second embodiment of FIG. 10 is intended to minimize the number of segments and distribute stress applied by the segment to spigot end 114 in a disjointed, uneven manner in order to conserve spigot integrity in selected areas about circumference C2. For example, where anticipated fluid pressure at the pipe joint is relatively high, a greater number of locking segments or a closer arrangement of locking segments may be beneficially used to increase restraint thereon. As another example, where anticipated fluid pressure at the pipe joint is relatively low or the durability of the pipe joint is in question, spigot integrity may instead be prioritized, such that fewer locking segments may be used, and/or the locking segments may be spaced or clustered further apart. In an exemplary implementation of the second embodiment, the locking segments 16 of the gasket 100 are spaced so to impinge upon about 40% to about 70% of the circumference of the exterior of spigot end 14 of the second plastic pipe. However, it will be understood that in different embodiments with different pipe diameters, different percentages may result where different numbers and arrangements of locking segments are selectively used, such variations being necessary to balance between the restraint necessary to avoid separation of the pipe joint and the structural integrity of the spigot. The effect of this optimization may be seen, for example, with reference to FIGS. 11A and 11B and at Table I.

Figure 11A:
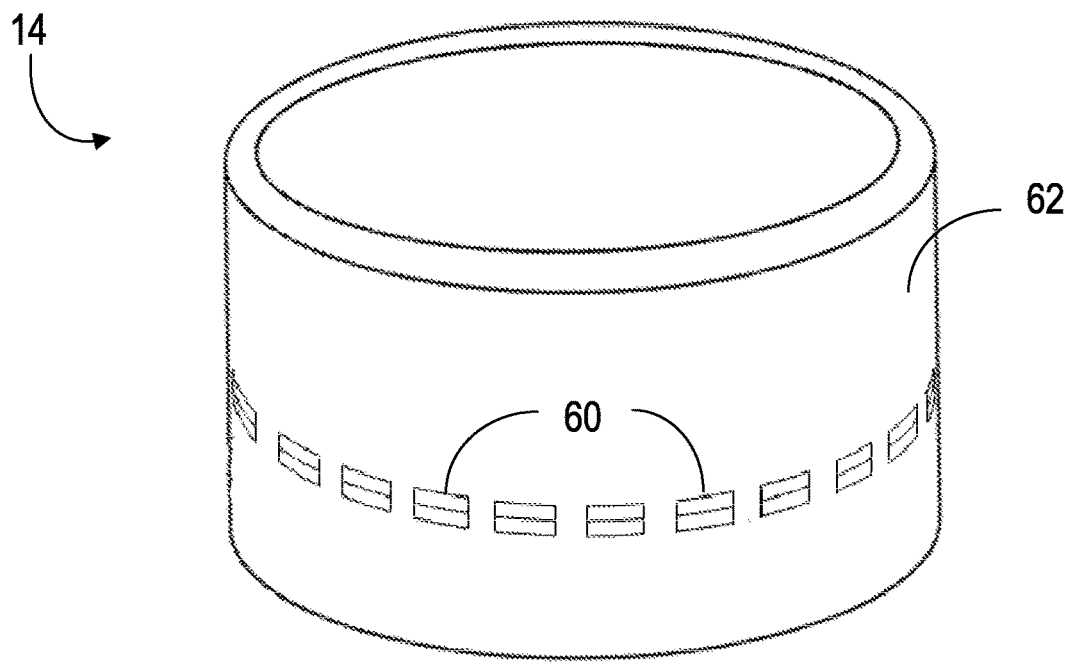
FIG. 11A is a perspective view of an exterior face of the illustrating locations of locking segment impingement thereupon.
Figure 12A:
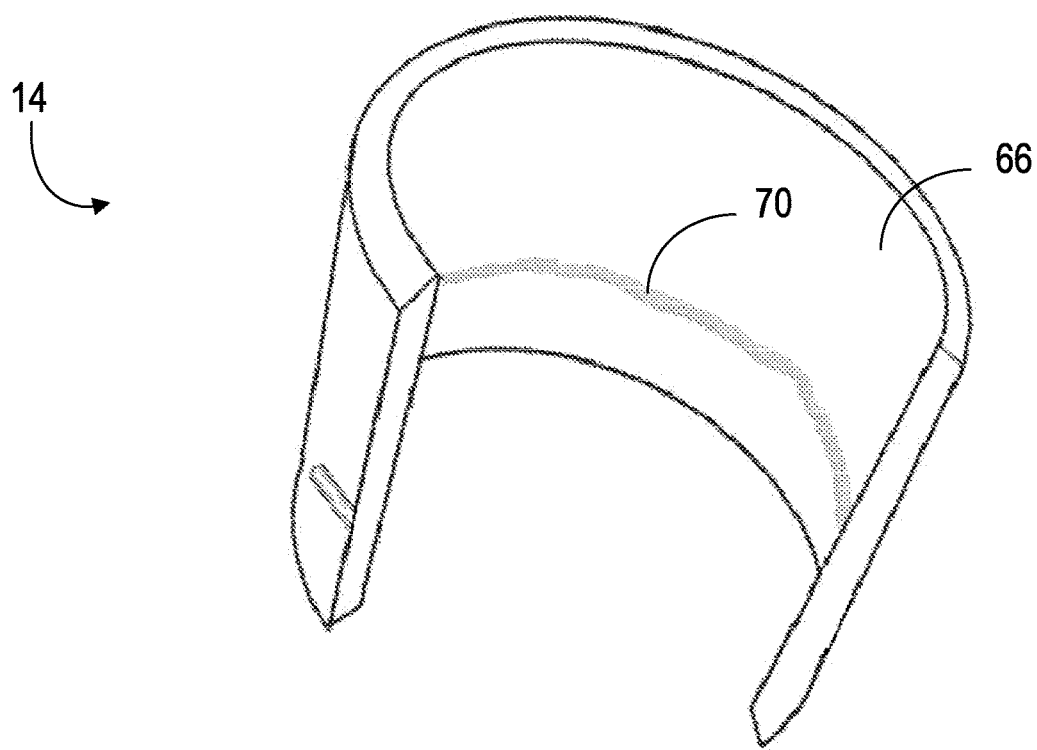
FIG. 12A is a sectional view of an interior face of the spigot of FIG. 11A illustrating areas of plastic deformation.

FIG. 11A illustrates spigot end 14 restrained by a gasket 12 in accordance with the first embodiment of the gasket (FIG. 3). As can be seen in FIG. 11A, the impingement of rows of bell teeth 42 of the locking segments 16 onto spigot end 14 of second plastic pipe 13 forms corresponding non-destructive indentations 60 in an exterior face 62 of spigot end 14. Because locking segments 16 are arranged equidistantly apart about a circumference of gasket 12, indentations 60 are also arranged equidistantly around exterior face 62. Further, because indentations 60 are arranged equidistantly and relatively close together, a continuous volume of plastic deformation of the plastic of second plastic pipe is seen when the pipe joint experiences normal operating pressures. This deformation occurs as a result of the compression of the plastic by locking segments 16 as the segments are wedged between pipes 11 and 13. The continuous volume of plastically deformed plastic is evidenced by a ring of discoloration 70 on an interior face 66 of the second plastic pipe 13 (opposite to the indentations 60), as illustrated in FIG. 12A. This ring of discoloration may be understood as a protrusion created by deformation from the application of axial pressure by the locking segments at the points of indentation 60 on the exterior face toward the interior of the pipe 13. While the locking segments 16 do not impinge through the second plastic pipe 13 to pierce into its interior, the axial pressure of the teeth of the locking segments serves to deform and/or discolor the interior face at the pressure points. The size or color of the ring of discoloration may vary depending on the amount and location of pressure.

Figure 11B:
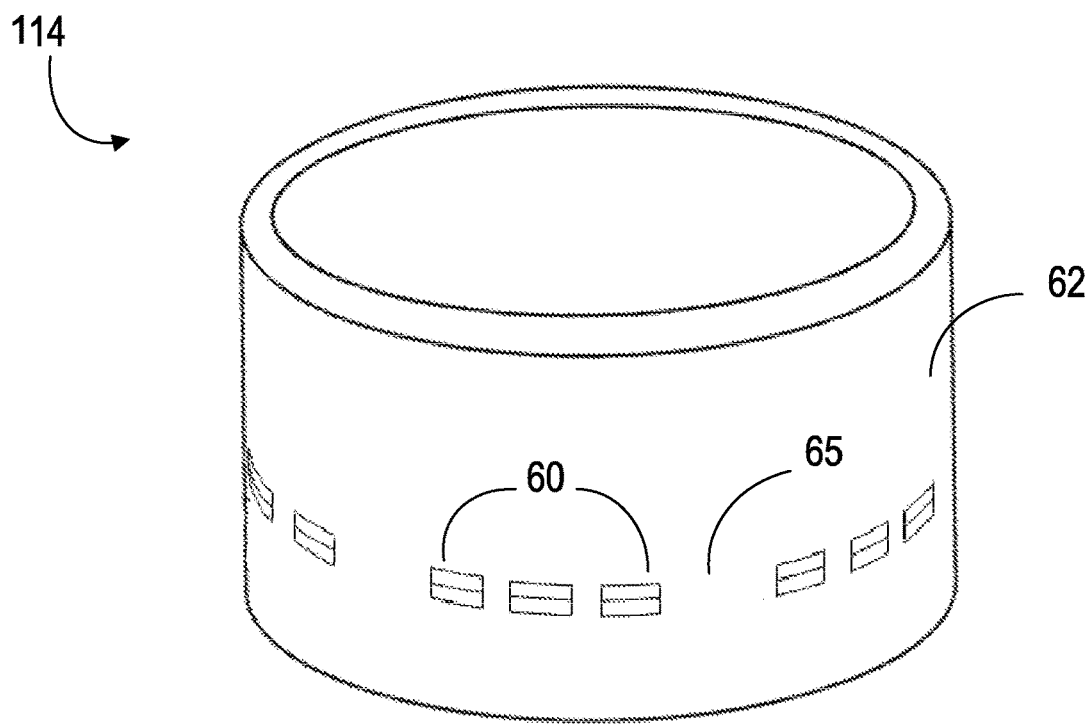
FIG. 11B is a perspective view of an exterior face of a spigot of FIG. 10 illustrating locations of locking segment impingement thereupon and locations without locking segment impingement when used with the gasket of FIG. 10.
Figure 12B:
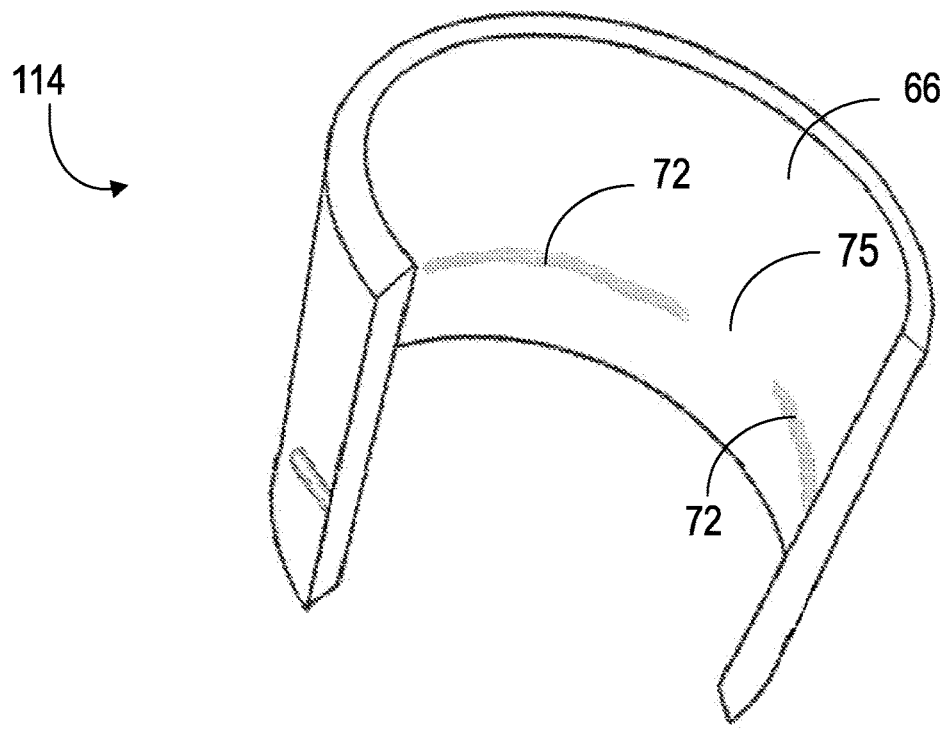
FIG. 12B is a sectional view of an interior face of the spigot of FIG. 11B illustrating areas of plastic deformation and areas without plastic deformation.

The gasket 100 illustrated in FIG. 10 imparts less pressure onto the restrained plastic pipe 13, resulting in less plastic deformation. With reference to FIG. 11B, when the second pipe is inserted into an opening of the second embodiment gasket 100, the rows of teeth 42 of the gasket impinge onto spigot end 114 forming corresponding indentations 60 in an exterior face 62 of spigot end 114. However, because the locking segments 16 of gasket 100 are not arranged equidistantly, but rather in spaced-apart clusters of three, the corresponding indentations 60 in exterior face 62 of the restrained plastic pipe are also not arranged equidistantly. Rather, in FIG. 11B, indentations 60 are arranged in clusters of three, with a portion 65 of the exterior face located between segment clusters, that is, corresponding to every "missing" fourth locking segment 16. These non-indented portions 65 retain their shape without being impinged upon. Similarly, as illustrated in FIG. 12B, a continuous volume of plastic deformation is illustrated on the interior face 66 of the spigot end 114, which does not retain a complete "ring" of discoloration 70, but rather, retains one or more spaced-apart lines of discoloration 72. Each line of discoloration 72 spans, on the interior face 66, the same length as the group of indentations 60 on the exterior face corresponding to one group of locking segments 16. Each line of discoloration is then followed by (is adjacent to) a section 75 of the interior face 66 that has no discoloration or deformation. That is, while a line of discoloration 72 spans one contiguous portion corresponding to one cluster of locking segments, the line of discoloration is spaced apart from and is non-continuous with a second line of discoloration corresponding to a second cluster of locking segments. The portions 75 of the interior face with no discoloration are located between the discoloration lines 72, and correspond to the portions of the second plastic pipe 13 at which there is a gap between the clusters of the impinging locking segments 16. As evidenced by the non-discolored portion 75 of the interior face, where the gasket 100 of the second embodiment is used, there is a volume of the interior face in which there is no plastic deformation due to axial pressure. The non-discolored portions maintain a higher structural integrity than do the disclosure portions.

Table I illustrates the sum of segment lengths as a percentage of spigot circumference for gaskets configured for use with standard-sized PVC pipe.

TABLE I

| Pipe Size, ID (inches) | Spigot Outer Surface Circumference (inches) | Sum of Segment Lengths (inches) | Sum of Segment Lengths as a Percentage of the Spigot Circumference (%) |
|---|---|---|---|
| 4 | 15.08 | 6 | 40 |
| 6 | 21.68 | 11.25 | 52 |
| 8 | 28.43 | 20 | 70 |
| 10 | 34.87 | 20 | 57 |
| 12 | 41.47 | 29 | 70 |
| 16 | 54.66 | 29 | 53 |

As will be apparent to one skilled in the art, various modifications can be made within the scope of the aforesaid description. Such modifications being within the ability of one skilled in the art form a part of the present invention and are embraced by the claims below. For example, it is contemplated that the pipe gasket of the present can be used to form a restrained seal between a bell of a metal pipe and a spigot of a plastic pipe. Additionally, the segments may be arranged in groups numbering two segments per group and more than three segments per group, such as four segments per group, five segments per group and six segments per group.

The invention claimed is:

1. A pipe joint comprising:
a gasket located within an annular groove of a bell socket of a first plastic pipe, the gasket including (a) an inner surface that defines a circumference of a first length and (b) a plurality of segments partially embedded within the gasket, each segment of the plurality of segments having opposing lateral edges and a second length extending to and between the opposing lateral edges; and
a second plastic pipe inserted through an opening defined by the inner annular surface,
wherein a sum of all of the second lengths is no more than 70% of the first length, and
wherein the plurality of segments is arranged in groups of three segments, each group of three segments being separated from each adjacent group of three segments by a first distance that is longer than the second length.

2. The pipe joint of claim 1, wherein the sum of all of the second lengths is no more than 50% of the first length.

3. The pipe joint of claim 1, wherein the sum of all of the second lengths is between 45% and 55% of the first length.

4. The pipe joint of claim 1, wherein each group of three segments includes a middle segment, opposing adjacent segments, and a second distance between the middle segment and each adjacent segment, the second distance being shorter than the second length.

5. A pipe joint comprising:
a gasket located within an annular groove of a bell socket of a first plastic pipe, the gasket including (a) an inner surface that defines a circumference of a first length and (b) a plurality of segments partially embedded within the gasket, each segment of the plurality of segments having opposing lateral edges and a second length extending to and between the opposing lateral edges; and
a second plastic pipe inserted through an opening defined by the inner annular surface,
wherein a sum of all of the second lengths is no more than 70% of the first length, wherein the plurality of segments are not equidistantly spaced along the inner annular surface.

6. A pipe joint comprising:
a gasket located within an annular groove of a bell socket of a first plastic pipe, the gasket including (a) an inner surface that defines a circumference of a first length and (b) a plurality of segments partially embedded within the gasket, each segment of the plurality of segments having opposing lateral edges and a second length extending to and between the opposing lateral edges; and
a second plastic pipe inserted through an opening defined by the inner annular surface,
wherein a sum of all of the second lengths is no more than 70% of the first length,
wherein the second plastic pipe includes an exterior face including a first group of spaced-apart indentations formed therein by a first group of the plurality of segments,
wherein the second plastic pipe includes an interior face including a first group of corresponding protrusions formed by the first group of spaced-apart indentations, and
wherein the first group of corresponding protrusions form a first contiguous protrusion.

7. The pipe joint of claim 6, wherein the exterior face of the second plastic pipe includes a second group of spaced-apart indentations formed therein by a second group of the plurality of segments,
wherein the interior face of the second plastic pipe includes a second group of corresponding protrusions formed by the second group of spaced-apart indentations, and
wherein the second group of corresponding protrusions form a second contiguous protrusion.

8. The pipe joint of claim 7, wherein the first group of the plurality of segments is spaced apart from the second group of the plurality of segments, and
wherein the first contiguous protrusion is spaced apart from the second contiguous protrusion.

9. A pipe joint comprising:
a gasket located within a groove of a bell socket of a first pipe, the gasket including an inner surface defining a circumference having a first length and a plurality of segments partially embedded within the gasket, each segment of the plurality of segments including a spigot tooth; and
a second pipe inserted through an opening defined by the inner surface, the second pipe being impinged upon by the plurality of segments,
wherein the second pipe includes:
an exterior face having a first group of space-apart indentations formed therein by a first group of the plurality of segments, the first group of spaced-apart indentations forming a first group of corresponding protrusions on an interior face of the second pipe, the first group of corresponding protrusions forming a first contiguous protrusion.

10. The pipe joint of claim 9 wherein the second pipe includes a second group of spaced-apart indentations formed in the exterior face by a second group of the plurality of segments, the second group of spaced-apart indentations forming a second group of corresponding protrusions on the interior face of the second pipe, the second group of corresponding protrusions forming a second contiguous protrusion.

11. The pipe joint of claim 10, wherein the first group of the plurality of segments is adjacent to the second group of the plurality of segments, and
wherein the first contiguous protrusion is spaced apart from the second contiguous protrusion.

12. The pipe joint of claim 10, wherein a volume of material of the second pipe located between the first contiguous protrusion and the second contiguous protrusion is not plastically deformed by the plurality of segments.

13. A pipe joint comprising:
a gasket located within a groove of a bell socket of a first pipe, the annular gasket including an inner surface defining a circumference having a first length and a plurality of segments partially embedded within the gasket, each segment of the plurality of segments including (a) a spigot tooth, (b) opposing lateral edges, and (c) a second length extending to and between the opposing lateral edges,
a second pipe inserted through an opening defined by the inner surface, the second pipe being impinged upon by the plurality of segments; and
a plurality of spaced-apart, plastically deformed portions formed in the second pipe by the plurality of segments,
wherein each spaced-apart plastically deformed portion of the plurality of spaced-apart plastically deformed portions is formed by at least two segments of the plurality of segments
wherein a sum of all of the second lengths is between approximately 40% to approximately 65% of the first length.

14. The pipe joint of claim 13, wherein the sum of all of the second lengths is equal to about 45% to about 55% of the first length.

15. A pipe joint comprising:
a gasket located within a groove of a bell socket of a first pipe, the annular gasket including an inner surface defining a circumference having a first length and a plurality of segments partially embedded within the gasket, each segment of the plurality of segments including (a) a spigot tooth, (b) opposing lateral edges, and (c) a second length extending to and between the opposing lateral edges,
a second pipe inserted through an opening defined by the inner annular surface, the second pipe being impinged upon by the plurality of segments;
a plurality of plastically deformed portions formed in the second pipe by the plurality of segments, each plastically deformed portion being formed by at least three segments of the plurality of segments; and
a non-deformed portion extending to and between each pair of adjacent plastically deformed portions,
wherein a sum of all of the second lengths is between approximately 40% to approximately 65% of the first length.

16. The pipe joint of claim 15, further comprising:
a plurality of spaced-apart indentations formed by the plurality of segments, in an exterior face of the second pipe.

17. The pipe joint of claim 16, wherein a sum of all lengths of the plurality of spaced-apart indentations is less than a sum of all lengths of the non-deformed portions.

18. An annular gasket comprising:
an inner surface; and
a plurality of segments partially embedded within the inner surface and arranged into groups of three segments, the groups of three segments comprising at least a first group of three segments and a second group of three segments, wherein each of the first group of three segments and the second group of three segments respectively comprises: a central segment and two segments adjacent to the central segments on opposite sides thereof, the central segment being separated from the adjacent segments by a distance of a second length, wherein the inner surface includes an intermediary portion located between the first group of three segments and the second group of three segments, the intermediary portion spanning a distance of a third length, and wherein the third length is longer than the second length.

* * * * *

UNITED STATES PATENT AND TRADEMARK OFFICE
CERTIFICATE OF CORRECTION

PATENT NO. : 11,112,043 B2
APPLICATION NO. : 16/789921
DATED : September 7, 2021
INVENTOR(S) : Daniel A. Copeland et al.

It is certified that error appears in the above-identified patent and that said Letters Patent is hereby corrected as shown below:

In the Claims

At Column 13, Claim 9, Line 53, replace the word "space-apart" with --spaced-apart--

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*